United States Patent
Huang

(10) Patent No.: US 9,756,651 B2
(45) Date of Patent: Sep. 5, 2017

(54) WIRELESS DEVICE AND METHOD FOR SETTING PACKET DE-QUEUE SCHEDULING OF PACKET QUEUE DEVICE BASED ON AIRTIME QUOTA ALLOCATION

(71) Applicant: MEDIATEK INC., Hsin-Chu (TW)

(72) Inventor: Hsien-Chun Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 170 days.

(21) Appl. No.: 14/791,483

(22) Filed: Jul. 6, 2015

(65) Prior Publication Data

US 2016/0183283 A1      Jun. 23, 2016

Related U.S. Application Data

(60) Provisional application No. 62/094,081, filed on Dec. 19, 2014.

(51) Int. Cl.
   *H04L 12/50* (2006.01)
   *H04W 72/12* (2009.01)
   *H04W 28/02* (2009.01)
   *H04L 12/865* (2013.01)
   *H04L 12/863* (2013.01)

(52) U.S. Cl.
   CPC ..... *H04W 72/1231* (2013.01); *H04L 47/6265* (2013.01); *H04L 47/6275* (2013.01); *H04W 28/0215* (2013.01); *H04W 72/121* (2013.01)

(58) Field of Classification Search
   CPC ....................................................... H04J 12/50

USPC ......................................................... 370/401
See application file for complete search history.

(56) References Cited

U.S. PATENT DOCUMENTS

| | | | |
|---|---|---|---|
| 6,564,047 | B1 | 5/2003 | Steele |
| 2008/0144599 | A1 | 6/2008 | Chen |
| 2013/0336319 | A1* | 12/2013 | Liu ...................... H04L 47/621 370/390 |
| 2014/0160929 | A1 | 6/2014 | Wu |

FOREIGN PATENT DOCUMENTS

| | | |
|---|---|---|
| EP | 1 817 878 B1 | 7/2009 |
| WO | 2014141026 A1 | 9/2014 |

* cited by examiner

*Primary Examiner* — Dang Ton
(74) *Attorney, Agent, or Firm* — Winston Hsu

(57) ABSTRACT

A wireless device includes a scheduler, arranged for setting a packet de-queue scheduling of a packet queue device having packets of a plurality of groups which are queued therein. Each of the plurality of groups includes at least one wireless communications client. The scheduler includes an information acquisition circuit, an airtime controller and a scheduling controller. The information acquisition circuit is arranged to obtain an airtime utilization or a throughput utilization of at least one group of a plurality of groups. The airtime controller is arranged to assign a plurality of airtime quota settings to the plurality of groups based on the airtime utilization or the throughput utilization of the at least one group of the plurality of groups. The scheduling controller is arranged to set the packet de-queue scheduling according to at least the airtime quota settings.

5 Claims, 5 Drawing Sheets

WIRELESS DEVICE AND METHOD FOR SETTING PACKET DE-QUEUE SCHEDULING OF PACKET QUEUE DEVICE BASED ON AIRTIME QUOTA ALLOCATION

CROSS REFERENCE TO RELATED APPLICATIONS

This application claims the benefit of U.S. provisional application No. 62/094,081, filed on Dec. 19, 2014, and incorporated herein by reference.

BACKGROUND

This application relates to wireless communications, and more particularly, to a method and apparatus for adjusting an airtime quota of User Equipment to improve quality of service (QoS).

The IEEE 802.11 standard has been widely applied in wireless communications applications in wireless local area network (WLAN). In an 802.11 wireless network, the physical transmission rate has a very large variation, which not only depends on distance from a client to an access point (AP), but also depends on the 802.11 standard modes. The physical rate range specified by 802.11b is from 1 Mbps (Megabits per second) to 11 Mbps, and the physical rate range specified by 802.11n is from 6.5 Mbps to 600 Mbps. A problem of "airtime unfairness" exists in conventional WLAN products. When there are several good quality links (e.g. near end users) and bad quality links (e.g. far end users) in the same WLAN, the bad quality links are assigned with less airtime due to the competitive mechanism of 802.11. Hence, the bad quality links may not have sufficient airtime for packet transmission, thus deteriorating user experience.

Therefore, there is a need for a method and apparatus for adjusting airtime quota of User Equipment to improve quality of service (QoS).

SUMMARY

One of the objectives of the present invention is to provide a method and an associated apparatus to adjust throughput and/or airtime of each group of clients, to improve the quality of a user experience.

An embodiment of the present invention provides a wireless device that comprises a scheduler for setting a packet de-queue scheduling of a packet queue device having packets of a plurality of groups which are queued therein. Each of the plurality of groups includes at least one wireless communications client. The scheduler includes an information acquisition circuit, an airtime controller and a scheduling controller. The information acquisition circuit is arranged to obtain an airtime utilization or a throughput utilization of at least one group of the plurality of groups. The airtime controller is arranged to assign a plurality of airtime quota settings to the plurality of groups based on the airtime utilization of the at least one group of the plurality of groups. The scheduling controller is arranged to set the packet de-queue scheduling according to at least the airtime quota settings.

Another embodiment of the present invention provides a method for setting a packet de-queue scheduling of a wireless device having packets of a plurality of groups which are queued therein. Each of the plurality of groups includes at least one wireless communications client. The method includes: obtaining an airtime utilization or a throughput utilization of at least one group of the plurality of groups; assigning a plurality of airtime quota settings to the plurality of groups based on the airtime utilization or the throughput utilization of the at least one group of the plurality of groups; and setting the packet de-queue scheduling according to the airtime quota settings.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
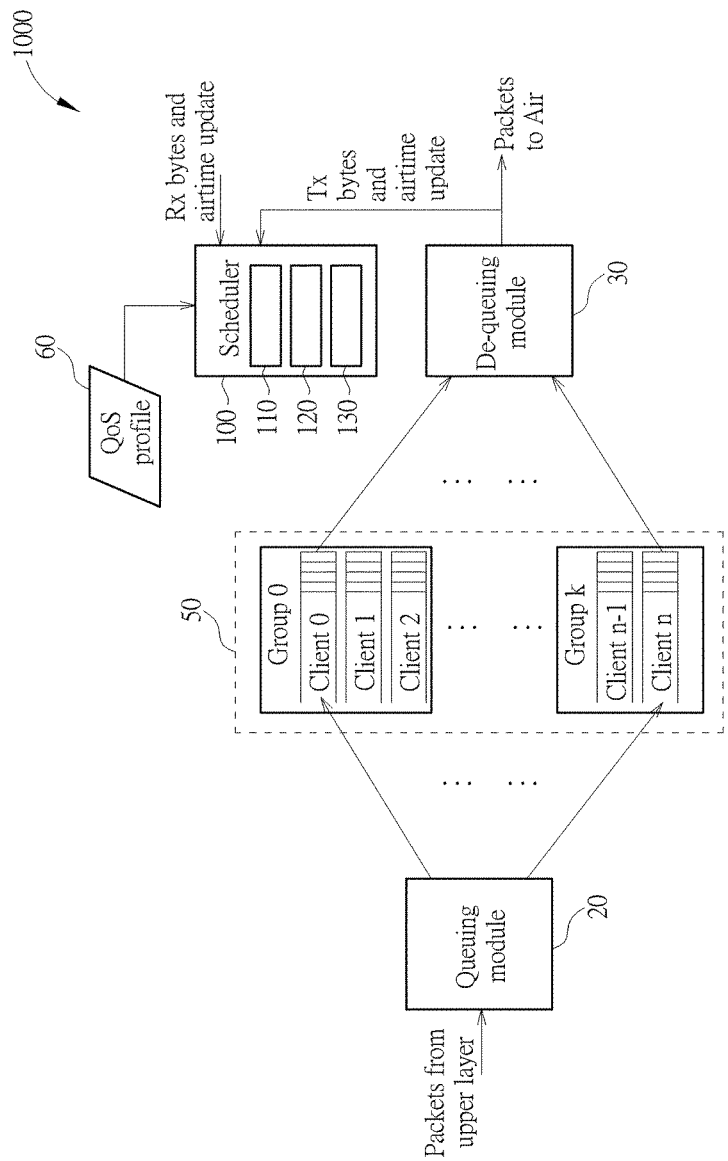
FIG. 1 is a diagram illustrating a wireless device according to an embodiment of the present invention.

Please refer to FIG. 1, which is a diagram illustrating a wireless device 1000 according to an embodiment of the present invention. The wireless device 1000 includes a queuing module 20, a de-queuing module 30, a packet queue device 50 and a scheduler 100. The wireless device 1000 may be an access point (AP) or a station working in soft-AP mode. It should be noted that only the elements pertinent to the present invention are shown in FIG. 1. In practice, the wireless device 1000 may be allowed to comprise additional elements.

The queuing module 20 is arranged to classify packets received from an upper layer, and queue the packets into queues of at least one group according to a determined classification result. The scheduler 100 is arranged to receive airtime information, the throughput information and the QoS profile 60, and generate a selection result accordingly (e.g. a group identification (ID) and a client identification), so that the de-queuing module 30 may refer to the selection result transmitted from the scheduler 100 to de-queue one or more packets from a selected queue corresponding to a selected group.

The received airtime information may indicate how much airtime is actually used by a WiFi access point for transmitting packets to a client, and/or how much airtime is actually used by a client for receiving packets transmitted from the WiFi access point. In other words, the airtime information of each client may be actively evaluated by a WiFi access point, and/or passively provided by a client linked to the WiFi access point. The received throughput information may include the data amount of packets (denoted as Tx bytes in FIG. 1) transmitted from a WiFi access point to a client, and/or the data amount of packets (denoted as Rx bytes in FIG. 1) received by a client from a WiFi access point. In other words, the throughput information of each client maybe actively evaluated by a WiFi access point, and/or passively provided by a client linked to the WiFi access point.

The QoS profile 60 includes conventional wireless standard modes. The scheduler 100 may use various wireless communications policies to compensate for the deficiency of the QoS profile 60, so that the airtime fairness based on the user requirements may be achieved.

Specifically, the scheduler 100 is arranged for setting a packet de-queue scheduling of the packet queue device 50 having packets of a plurality of groups (e.g. groups 0-k) which are queued therein. Each of the plurality of groups corresponds to at least one wireless communications client. For example, group 0 includes clients 0-2, and group k includes clients (n-1) and n, as shown in FIG. 1. Each of the groups 0-k may correspond to a hotspot, and the clients may be mobile phones, tablets, notebook, etc. Clients should enter a corresponding password in advance to connect to a hotspot, however.

In this embodiment, the scheduler 100 includes an information acquisition circuit 110, an airtime controller 120 and a scheduling controller 130. The information acquisition circuit 110 is arranged to obtain airtime utilization (e.g. the received airtime information) of at least one group of the groups 0-k. In this way, the scheduler 100 may change the de-queue policy for specific users/clients. The airtime controller 120 is arranged to assign a plurality of airtime quota settings to the plurality of groups 0-k at least based on the airtime utilization and/or the throughput of the at least one group of the plurality of groups 0-k. The scheduling controller 130 is arranged to set the packet de-queue scheduling according to at least the airtime quota settings.

The term "airtime quota" may refer to the concept of "token bucket". The token bucket is an algorithm used in packet switched telecommunications networks. It can be used to check that data transmissions, in the form of packets, conform to defined limits on the bandwidth. When a packet is to be checked for conformance to the defined limits, the bucket is inspected to see if it contains sufficient tokens at that time. If the packet has run out of tokens, the corresponding hotspot will stop serving the packet. Then, the spared airtime may be allocated to other clients.

Figure 2:
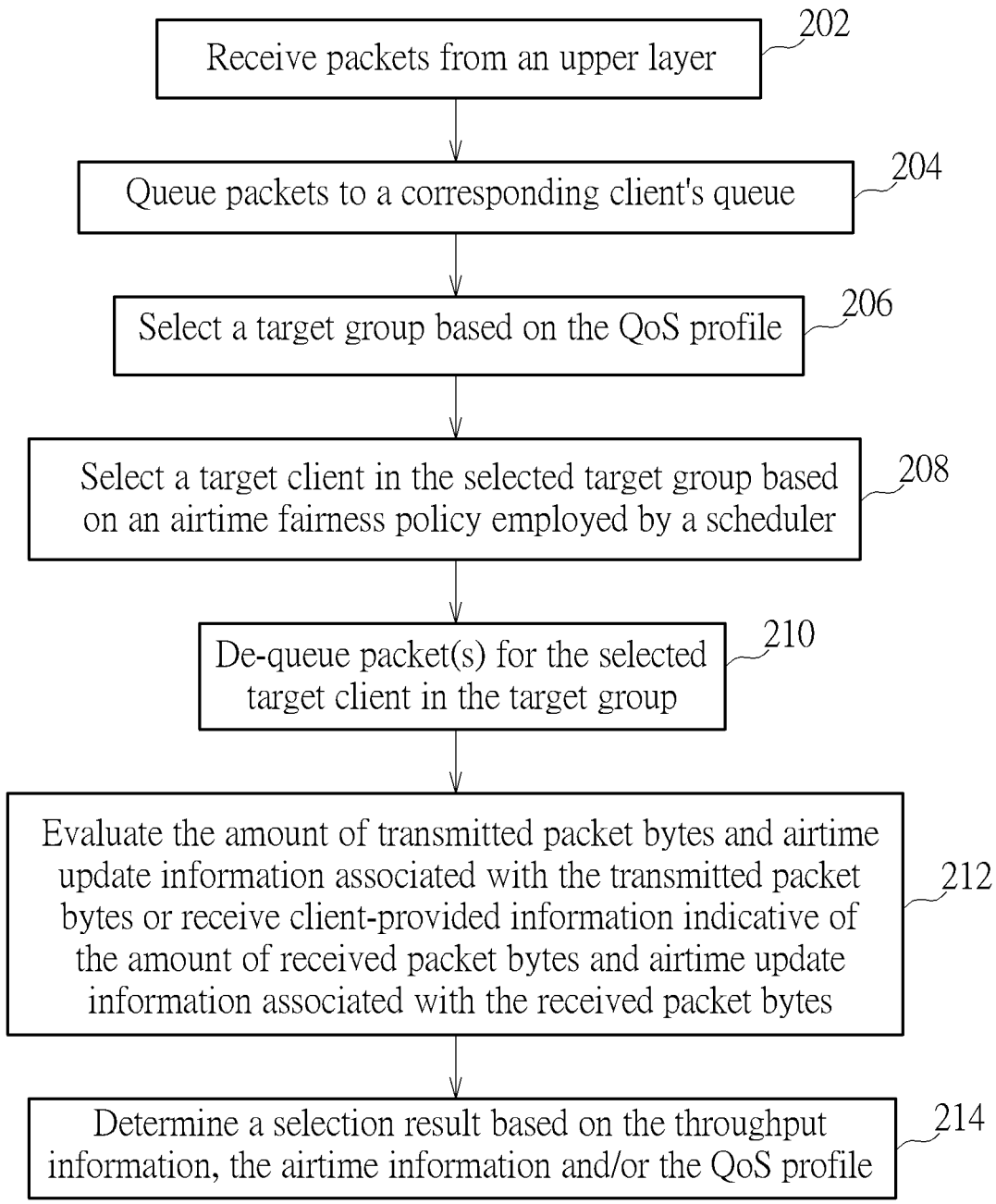
FIG. 2 is a flowchart illustrating the operation of the wireless device shown in FIG. 1.

Please refer to FIG. 2, which is a flowchart illustrating the operation of the wireless device 1000 shown in FIG. 1 according to an embodiment of the present invention. The operation of the wireless device 1000 may be summarized as follows.

Step 202: Receive packets from an upper layer.
Step 204: Queue packets to a corresponding client's queue.
Step 206: Select a target group based on the QoS profile.
Step 208: Select a target client in the selected target group based on an airtime fairness policy employed by a scheduler.
Step 210: De-queue packet(s) for the selected target client in the target group.

Step 212: The scheduler evaluates the amount of transmitted packet bytes and airtime update information associated with the transmitted packet bytes for at least one client, or receives information (e.g., the information provided by a client) indicative of the amount of received packet bytes and airtime update information associated with the received packet bytes for at least one client.

Step 214: The scheduler determines a selection result based on the throughput information (e.g. transmitted/received byte amount of each group), the airtime information (e.g. the airtime utilization of each group that is updated based on the airtime update information of clients belonging to the group), and/or the QoS profile.

Figure 3:
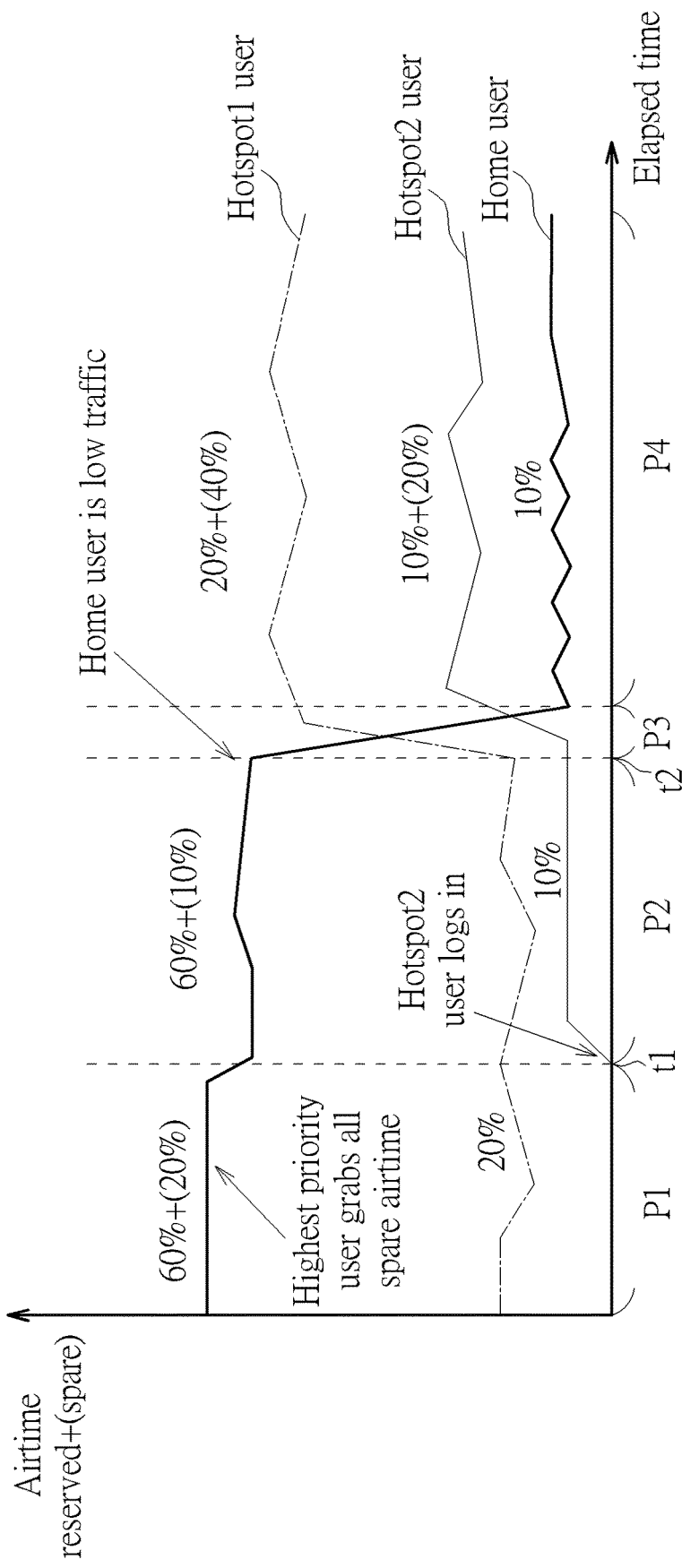
FIG. 3 is a diagram illustrating a scenario of an airtime fairness policy applied to the wireless device shown in FIG. 1 according to an embodiment of the present invention.

Please refer to FIG. 3, which is a diagram illustrating a scenario of an airtime fairness policy applied to the wireless device 1000 shown in FIG. 1 according to an embodiment of the present invention, wherein the x-axis represents the elapsed time, and the y-axis represents the reserved airtime plus spare airtime. The wireless device 1000 maybe implemented as a WiFi AP in this embodiment. Although there is only one home user, one first hotspot user and one second hotspot user respectively belonging to three different groups as shown in FIG. 3, each of those groups may actually include multiple clients. Further, if transmission types of all clients in a group are the same, e.g. all clients perform File Transfer Protocol (FTP) transmission, the queuing module 20 may evenly allocate airtime to the clients. If one of the clients performs video transmission while the remaining clients still perform FTP transmission, however, this client may be allocated with more airtime.

Please note that the first hotspot user and the second hotspot user (hereinafter the hotspot1 user and the hotspot2 user) are connected to two different respective hotspots. Amongst the three users, the home user is a client of the highest-priority group among all the groups. The priorities of the hotspot1 user and the hotspot2 user are both lower than the priority of the home user.

In the period P1, only the groups of the home user and the hotspot1 user are connected to the AP. Since the home user has the highest priority, 60% airtime is reserved for the home user, and 20% airtime is reserved for the hotspot1 user. For example, the AP may lock the airtime upper limit of the hotspot1 user at 20% based on the policy, and the remaining 20% airtime (spare airtime) will be allocated to the home user, to ensure that the home user gets the best service. The hotspot2 user logs in at timing t1, and is allocated with 10% airtime in the period P2. Hence, there is only 10% spare airtime left to the home user during the period P2.

When the home user has low traffic at timing t2 (e.g. the home user stops using the AP at this time), the airtime occupied by the home user drops rapidly—for example, from 70% to 10% during the period P3—and the spare airtime released by the home user will be weighted shared by the hotspot1 user and the hotspot2 user based on the policy during the period P4. Specifically, when the airtime utilization of the highest-priority group (e.g. the group of the home user) is reduced (e.g. low traffic), the airtime controller 120 of the wireless device 1000 will decrease the airtime quota setting assigned to the highest-priority group, and increase the airtime quota setting assigned to at least one lower-priority group in the groups (e.g. the hotspot1 user and the hotspot2 user).

In the example illustrated in FIG. 3, the ratio of spare airtime respectively given to the hotspot1 user and the hotspot2 user in the period P4 is 2:1 (i.e. 40%:20%), which is equal to the ratio of airtime respectively reserved for the hotspot1 user and the hotspot2 user in the period P4 (i.e.

20%:10%). This is merely for illustrative purposes; in some embodiments of the present invention, the spare airtime arrangement may be different based on actual requirements.

Figure 4:
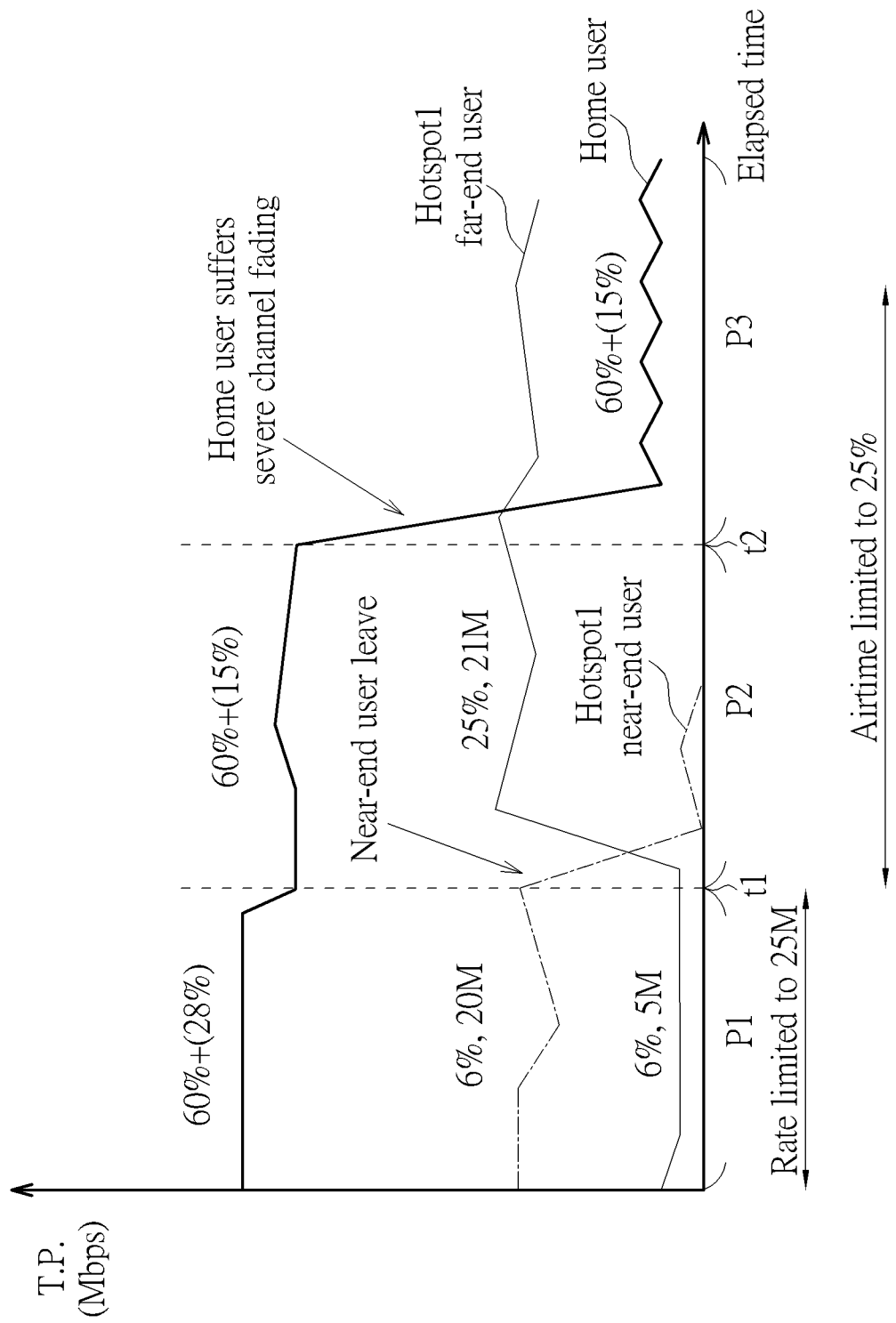
FIG. 4 is a diagram illustrating the scenario of an airtime fairness policy applied to the wireless device shown in FIG. 1 according to another embodiment of the present invention.

Please refer to FIG. 4, which is a diagram illustrating a scenario of an airtime fairness policy applied to the wireless device 1000 shown in FIG. 1 according to another embodiment of the present invention. The wireless device 1000 can be implemented as a WiFi AP in this embodiment. As before, among the three clients, the home user is a client of the highest-priority group amongst the groups. In this embodiment, the home user belongs to one group, while a first hotspot user and a second hotspot user both belong to another group. The priorities of the first hotspot user and the second hotspot user are both lower than the priority of the home user. Moreover, in this embodiment, the first hotspot user is a near-end user, and the second hotspot user is a far-end user (hereinafter the hotspot1 near-end user and the hotspot1 far-end user).

In this embodiment, the airtime controller 120 of the scheduler 100 controls a summation of the airtime quota setting assigned to the lower-priority group in which the hotspot1 near-end user and the hotspot1 far-end user are included to not exceed a predetermined airtime threshold (e.g. a 25% airtime upper limit). In addition, the airtime controller 120 controls the summation of throughput of the hotspot1 near-end user and the hotspot1 far-end user of the lower-priority group to not exceed a predetermined throughput threshold (e.g. 25 Mbps). Please note that a difference between this embodiment and the previous embodiment is that the airtime controller 120 in this embodiment is arranged to assign a plurality of airtime quota settings to the plurality of groups based on the throughput of the at least one group of the plurality of groups. That is, the airtime controller 120 controls at least one airtime quota setting assigned to at least one specific group according to the throughput of a specific group (or the summation of the throughput of a plurality of specific groups) and a predetermined throughput threshold.

As shown in FIG. 4, the home user, the hotspot1 near-end user and the hotspot1 far-end user are connected to the AP in the period P1, wherein the priority of the home user is higher than that of the hotspot1 user. In the period P1, since the summation of the airtime used by the hotspot1 near-end user and the hotspot1 far-end user is lower than 25% (6%+6%<25%), and the summation of the throughput of the hotspot1 near-end user and the hotspot1 far-end user does not exceed 25 Mbps, the airtime allocated to the hotspot1 far-end user and the hotspot1 near-end user will not be adjusted by the air time controller 120. That is, airtime adjustment is enabled only when both the airtime and throughput reach predetermined conditions, respectively. After the airtime settings of both of the hotspot1 near-end user and the hotspot1 far-end user are determined, all the spare airtime is allocated to the home user, so that the home user has a total airtime of 88%. Once the throughput of the hotspot1 near-end user which has higher priority than the hotspot1 far-end user reaches a predetermined value, the air time controller 120 will reduce the airtime allocated to the hotspot1 near-end user, and increase the airtime allocated to the hotspot1 far-end user. Hence, the service quality is provided according to actual usages of different users, rather than according to distances between the AP and different users (i.e. the distances between the AP and electronic devices (e.g. mobile phones and/or tablets) of different users.

In other words, the airtime amount allocated to the hotspot1 near-end user which has good connection quality is reduced for airtime fairness, so that the saved airtime amount may be used to assist the hotspot1 far-end user which has poor connection quality. Via this embodiment, the far-end user may have more airtime to benefit from a fair connection service, and does not easily suffer the connection quality drop when they are at a distance from the AP. The hotspot1 far-end user may thereby be fairly served.

At timing t1, the hotspot1 near-end user stops connecting to the AP (i.e. leaves the AP) due to dissatisfaction with the service of the AP (or other reasons), and thus more airtime can be used to assist the hotspot1 far-end user. Further, some spare airtime previously allocated to the home user is also released to the hotspot1 far-end user. The airtime allocated to the hotspot1 far-end user is controlled to not exceed 25%, and the throughput of the hotspot1 far-end user is controlled to not exceed 25 Mbps. The 25% airtime is continuously allocated to the hotspot1 far-end user in the periods P2 and P3 until the throughput of the hotspot1 far-end user reaches 25 Mbps, despite the home user suffering severe channel fading at the timing T2. Under the policy of this embodiment, even though the home user's throughput drops significantly, a best effort is still made for the weaker hotspot user (e.g. the hotspot1 far-end user).

Figure 5:
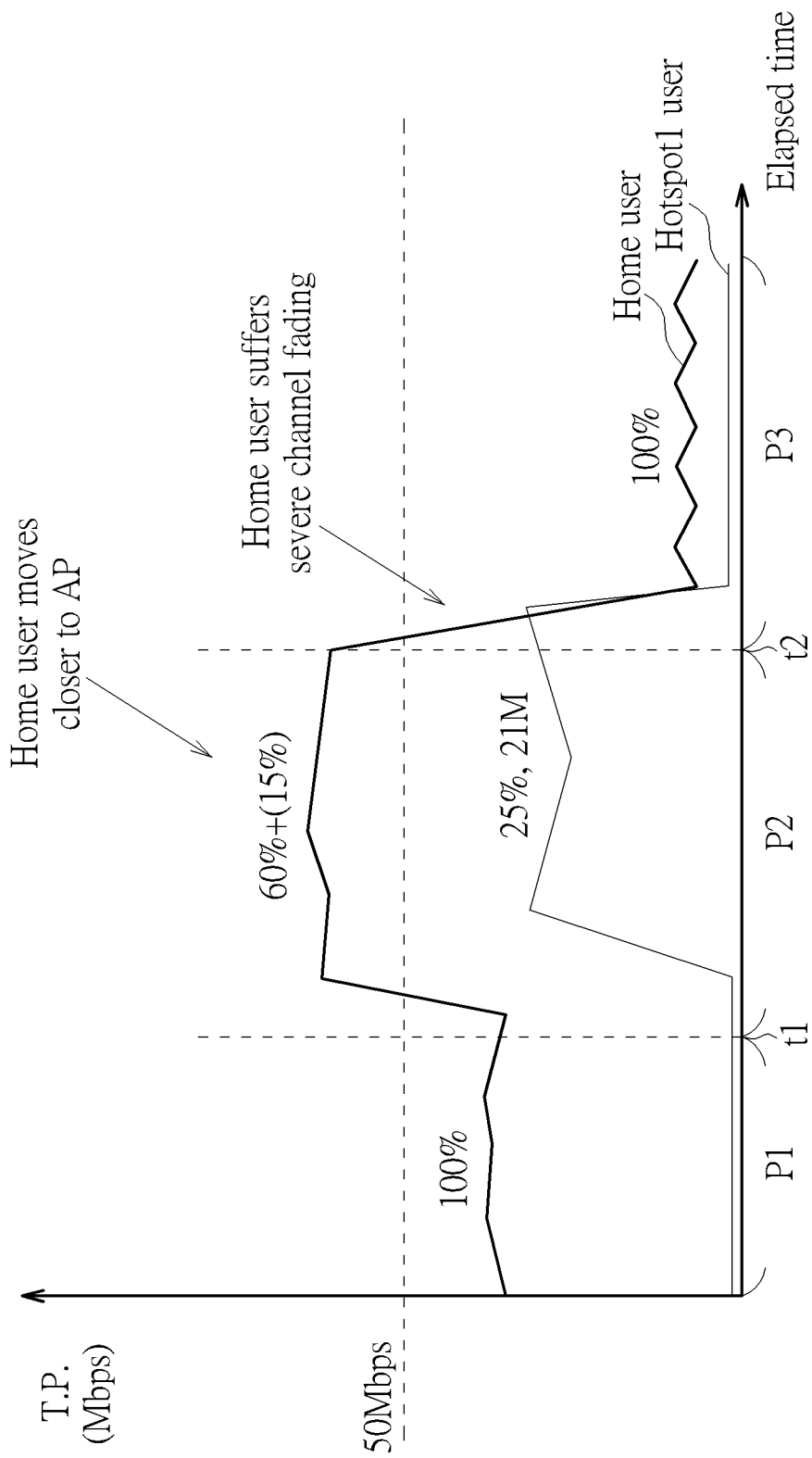
FIG. 5 is a diagram illustrating the scenario of an airtime fairness policy applied to the wireless device shown in FIG. 1 according to yet another embodiment of the present invention.

FIG. 5 is a diagram illustrating a scenario of an airtime fairness policy applied to the wireless device 1000 shown in FIG. 1 according to yet another embodiment of the present invention. The wireless device 1000 is implemented as a WiFi AP. Although only a home user and a hotspot user (denoted as "hotspot1 user") belonging to two different groups are shown in FIG. 5, each of the two groups may actually include multiple clients. Among the two clients, the home user is a client having the highest-priority group.

In accordance with the policy of this embodiment, the home user is guaranteed to have fastest transmission rate due to its highest priority. As shown in FIG. 5, when the throughput of a highest-priority group (e.g. a home user) does not exceed a predetermined throughput threshold, the airtime controller 120 assigns a maximum airtime quota setting to the highest-priority group, and assigns a minimum airtime quota setting to each lower-priority group (e.g. a hotspot user) in the plurality of groups; and when the throughput of the highest-priority group exceeds the predetermined throughput threshold, the airtime controller 120 decreases the airtime quota setting assigned to the highest-priority group in the plurality of groups, and increases an airtime quota setting assigned to each lower-priority group in the plurality of groups. For example, when the home user has not reached a predetermined throughput threshold in the period P1, the home user is allocated with all the airtime, i.e. 100% airtime, to ensure that the home user obtains an acceptable connection quality, so that the hotspot1 user is allocated with zero airtime. When the throughput of the home user reaches a predetermined throughput threshold (e.g. 50 Mbps), the airtime controller 120 will decrease the airtime quota setting assigned to the home user, and increase the airtime quota setting assigned to the hotspot1 user in the period P2. The home user may therefore reach the maximum throughput without using 100% airtime, which allows some airtime to be spared to assist the hotpot1 user. In this example, the home user may reach the maximum throughput by using 60% airtime. The airtime upper limit of the hotspot1 user is locked at 25%, and 15% spare airtime is allocated to the home user.

When the home user suffers severe channel fading in the period P3, the AP allocates all airtime (i.e. 100% airtime) to the home user once more. Under the policy of this embodiment, all of the airtime allocated to the hotspot1 user in the period P2 will be released to the home user in the period P3.

In this way, the home user is guaranteed a full-time high connection quality, and some low-priority users may share the wireless communications service as long as the AP has sufficient airtime margins.

The above policy can also be applied to a case of multiple lower-priority groups. For example, assuming that there are multiple lower-priority groups connected to the AP, when the throughput of the home user reaches a predetermined throughput threshold (e.g. 50 Mbps) in the period P2, the airtime controller 120 decreases an airtime quota setting assigned to the home user, and increases an airtime quota setting assigned to remaining lower-priority users.

To summarize, the embodiments of the present invention provide an apparatus and methods for adjusting airtime quota of User Equipment to improve quality of service (QoS). By transferring part of the airtime used by a primary user (e.g. the home user) to a low connection quality user (e.g. a far-end user), the connection quality of this low connection quality user may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for setting a packet de-queue scheduling of a packet queue device having packets of a plurality of groups which are queued therein, each of the plurality of groups including at least one wireless communications client, the method comprising:
    obtaining an airtime utilization or a throughput utilization of at least one group of the plurality of groups;
    assigning a plurality of airtime quota settings to the plurality of groups at least based on the airtime utilization or the throughput utilization of the at least one group of the plurality of groups; and
    setting the packet de-queue scheduling according to at least the airtime quota settings;
    wherein when an airtime utilization of a highest-priority group in the plurality of groups is reduced, decreasing an airtime quota setting assigned to the highest-priority group, and increasing an airtime quota setting assigned to a lower-priority group in the groups.

2. The method of claim 1, wherein the step of assigning the plurality of airtime quota settings to the plurality of groups comprises:
    controlling a summation of at least one airtime quota setting assigned to a lower-priority group to not exceed a predetermined airtime threshold.

3. The method of claim 1, wherein the step of assigning the plurality of airtime quota settings to the plurality of groups comprises:
    controlling an airtime quota setting assigned to a lower priority group according to a summation of throughput of all clients belonging to the lower priority group and a predetermined throughput threshold.

4. A method for setting a packet de-queue scheduling of a packet queue device having packets of a plurality of groups which are queued therein, each of the plurality of groups including at least one wireless communications client, the method comprising:
    obtaining an airtime utilization or a throughput utilization of at least one group of the plurality of groups;
    assigning a plurality of airtime quota settings to the plurality of groups at least based on the airtime utilization or the throughput utilization of the at least one group of the plurality of groups; and
    setting the packet de-queue scheduling according to at least the airtime quota setting;
    wherein the step of assigning the plurality of airtime quota settings to the plurality of groups comprises:
    when a summation of throughputs of a plurality of lower priority groups reaches a predetermined throughput threshold, decreasing an airtime quota setting assigned to a highest-priority group in the plurality of specific groups, and increasing an airtime quota setting assigned to at least one lower-priority group in the plurality of lower priority groups.

5. A method for setting a packet de-queue scheduling of a packet queue device having packets of a plurality of groups which are queued therein, each of the plurality of groups including at least one wireless communications client, the method comprising:
    obtaining an airtime utilization or a throughput utilization of at least one group of the plurality of groups;
    assigning a plurality of airtime quota settings to the plurality of groups at least based on the airtime utilization or the throughput utilization of the at least one group of the plurality of groups; and
    setting the packet de-queue scheduling according to at least the airtime quota setting;
    wherein the step of assigning the plurality of airtime quota settings to the plurality of groups comprises:
    when a throughput of a highest-priority group does not exceed a predetermined throughput threshold, assigning a maximum airtime quota setting to the highest-priority group, and assigning a minimum airtime quota setting to each lower-priority group in the plurality of groups; and
    when the throughput of the highest-priority group exceeds the predetermined throughput threshold, decreasing an airtime quota setting assigned to the highest-priority group in the plurality of groups, and increasing an airtime quota setting assigned to at least one lower-priority group in the plurality of groups.

* * * * *